United States Patent
Bilder et al.

(10) Patent No.: US 7,860,461 B1
(45) Date of Patent: *Dec. 28, 2010

(54) METHOD FOR USER-AIDED NETWORK PERFORMANCE AND CONNECTION QUALITY REPORTING

(75) Inventors: Mitchell Bilder, Manalapan, NJ (US); Donnie Henderson, Manalapan, NJ (US)

(73) Assignee: AT&T Intellectual Property II, L.P., Reno, NV (US)

(*) Notice: Subject to any disclaimer, the term of this patent is extended or adjusted under 35 U.S.C. 154(b) by 70 days.

This patent is subject to a terminal disclaimer.

(21) Appl. No.: 12/266,401

(22) Filed: Nov. 6, 2008

Related U.S. Application Data

(63) Continuation of application No. 11/240,663, filed on Sep. 30, 2005, now Pat. No. 7,450,908.

(60) Provisional application No. 60/622,042, filed on Oct. 26, 2004.

(51) Int. Cl.
*H04B 17/00* (2006.01)

(52) U.S. Cl. .............. 455/67.11; 455/67.13; 455/67.14; 370/229; 370/252; 370/353; 379/22; 379/24; 379/27.06; 379/29.02

(58) Field of Classification Search .............. 455/67.11, 455/67.13, 67.14; 370/229, 252, 353; 379/22, 379/24, 27.06, 29.02
See application file for complete search history.

(56) References Cited

U.S. PATENT DOCUMENTS

| | | | |
|---|---|---|---|
| 5,875,229 A * | 2/1999 | Eyuboglu et al. | .......... 379/1.04 |
| 5,920,608 A | 7/1999 | Minesishi | |
| 6,430,266 B2 | 8/2002 | Gershon | |
| 6,574,308 B1 | 6/2003 | MacDonald | |
| 6,606,372 B2 | 8/2003 | Yi et al. | |
| 6,768,720 B1 | 7/2004 | Kamstra et al. | |
| 6,801,756 B1 | 10/2004 | Agrawal et al. | |
| 6,901,137 B2 | 5/2005 | Rosen et al. | |
| 2003/0227870 A1 | 12/2003 | Wagner et al. | |

* cited by examiner

*Primary Examiner*—Sanh D Phu
(74) *Attorney, Agent, or Firm*—Hope Baldauff Hartman, LLC

(57) ABSTRACT

Method for user-aided communication evaluation and performance and for producing a quality report regarding a communication connection entails signaling of a services provider by a first endpoint user in real-time entails establishing a first communication link between the first endpoint user and a second endpoint user. A second communication link between the first end point user and the services provider is determined. The methods continue by analyzing of the first and second communication links for quality by the services provider and generating statistics based on the analysis for quality in the connection. The methods can conclude by producing a quality report using those statistics. The quality report can initiate an immediate response in real-time or can be stored for a later response.

9 Claims, 1 Drawing Sheet

METHOD FOR USER-AIDED NETWORK PERFORMANCE AND CONNECTION QUALITY REPORTING

CROSS REFERENCE TO RELATED APPLICATIONS

The present application is a Continuation of U.S. Pat. No. 7,450,908 filed on Sep. 30, 2005, entitled: "Method for User-Aided Network Performance and Connection Quality Reporting", which claims priority to U.S. Provisional Patent Application Ser. No. 60/622,042 filed on Oct. 26, 2004. These references are incorporated herein.

FIELD

The present embodiments relate to methods for user-aided communication evaluation and performance, in real-time, and production of a quality report for a communications connection.

BACKGROUND

Evaluation, testing, and maintenance of quality in a communications network, particularly transmission and communication connections in telephony communications, has become necessary and costly. This necessary tasks is driven by the increasing number of people who have become directly affected by poor quality communication connections, and their need for a way to report the problem and receive an appropriate response in real-time.

A person or end-user in a communication connection can be the first to perceive or detect a degradation of quality in the communications network. Traditionally, this end-user might notify his/her network provider in order to report the problem and, then, wait for a subsequent contact or response from the provider regarding the problem. Also, the end-user might have to repeat the reporting several times to actually remedy all the existing quality problems.

Thus, a need exists for a method to acquire information in real-time from an end-user regarding quality communication performance and to produce a quality report for a communications connection in real-time. The endpoint user's perceived quality data or problem reporting can be used by the services provider to improve communication performance in real-time and to foster new services, applications, etc.

Communications providers, in addition to possessing the ability to receive accurate reports from an end-user, must be able to perform monitoring and testing in real-time to detect and respond to any changes in the quality of a link in the communications network. Previous methods for testing the integrity of the links in telephony systems have included the transmission of signals and frequency tests along a communications link. In addition, this testing can require lengthy durations and can lead to substantial delays in response times.

Thus, a need exists for an endpoint user to have the ability, in real-time, to provide information in an intelligent format to a communications provider, that will aid the communications provider in performing a required testing or monitoring of the connection and preparing a response in real-time using a quality information report prepared by the communications provider.

The present embodiments meet these needs.

SUMMARY

The present embodiments are methods for evaluating the quality of a communication network, in real-time, and producing a quality report for a communication connection.

End-point users, who are affected by quality problems in a communications connection, are given the ability to report these problems in real-time to a services provider. The end-point users can serve as perceivers or detectors of the quality in a communications connection. The perceived quality information can be reported by the end-user to a network, in real-time, so the communications provider can incorporate the information into their monitoring, testing, tuning, and problem-isolation methodologies. Then, using this information, the communications provider can produce a quality report in real-time that can be used to address the problem. Endpoints can refer to IP voice/video communications devices, such as voice-over-IP telephone and/or IP videophone type devices.

The present methods begin with the signaling of a services provider by a first endpoint user in real-time. The next step involves the communications provider determining a first communication link between the first endpoint user and a second endpoint user. A third step in the method is the communications provider determining a second communication link between the first end point user and the services provider. A fourth step in the method involves the analyzing of the first and second communication links for quality by the services provider and generating statistics based on the analysis for quality in the connection.

Analysis of the communication links can be done by transmitting and receiving data test packets on the communication links to determine if data test packets are dropped or delayed or corrupted during communication, which can indicate a communications link performance degradation and a decrease in the quality of the communications connection.

Statistics can comprise an alert, a data snapshot on the status of the communication links at a given moment in time, information on noise on a call using the communication links, information concerning dropped data packets over the communication links, information on delayed data packets over the communication links, and combinations thereof.

The methods next include producing a quality report in real-time using those statistics. The quality report can be stored for a later response, or the report can be used to initiate an immediate response, such as adjusting controllable equipment or software to improve the quality of a communications connection in real time.

DETAILED DESCRIPTION OF THE EMBODIMENTS

Figure 1:
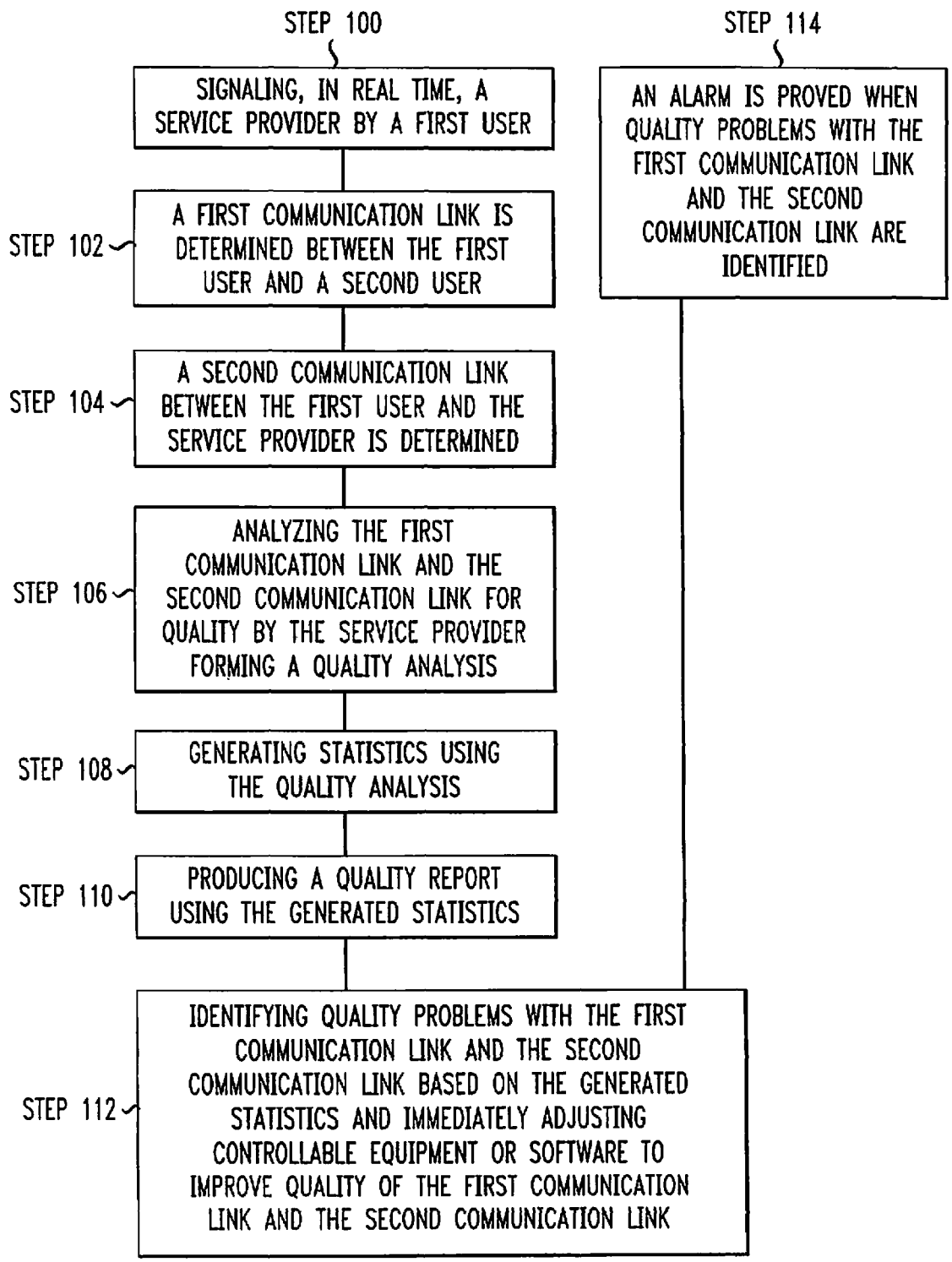
FIG. 1 depicts a flow diagram for an embodiment of the method.

Before explaining the present embodiments in detail, it is to be understood that the embodiments are not limited to the particular embodiments, and they can be practiced or carried out in various ways.

The present embodiments relate to methods for obtaining communication connection quality information from an endpoint user, in real-time. This quality information can be used in performing testing and monitoring of a communications connection to produce a quality report and response.

An end-point user can be considered the ultimate perceiver or detector of quality and quality degradation for a communications connection. An end-point user can be the first to be affected by a degradation of quality in a communication; and thus, the user can acquire a need to report the quality problem to a communications provider.

The endpoint user can be given the ability to report perceived communication connection quality degradations. This quality information can be reported by the end-user to a network, in real-time, to a communications provider. The communications provider can incorporate the information into their monitoring, testing, tuning, and problem-isolation methodologies to generate statistics. Using these statistics, the communications provider can produce a quality report that can address the problem and improve the performance of the communications connection. The quality report can be used also to foster a new or additional service to the user, a new application of an existing service to the user, or new classes of services (CoS) for communications providers, and combinations thereof.

The present embodiments involve signaling of a services provider by a first endpoint user, in real time, regarding a perceived communication connection quality degradation. The services provider can be a land line telephone service provider, a voice over IP service provider, a cellular service provider, a satellite telephone service provider, or any combinations thereof. Examples of manners for the first endpoint user to signal the provider include touch tone sequences, special signaling sequences from a voice over IP telephony device, dial tone multi-frequency (DTMF) tones from a conventional telephone, and any combinations thereof.

The methods include the step of a communications provider determining a first communication link between the first endpoint user and a second endpoint user. When the communications provider receives a signal from a first endpoint user, the provider can use computer instructions to determine the existence of a link between the first endpoint user and a second endpoint user and to begin an analysis of the connection. Examples of connection types include IP connections, telephone connections, or any combination of these or other network connections.

The methods continue be establishing a second communication link between the first endpoint user and the communications provider. The communications provider can use computer instructions to determine the existence of a link between the first endpoint user and the communications provider for receiving quality information from the endpoint user. After the links have been established, the computer instructions can perform an analysis automatically and in real-time, or this analysis can be delayed and performed later in a batch analysis.

Next, the first and second communication links are analyzed for quality by the services provider and statistics are generated based on the analyses for quality in the connection(s). An analysis of the communications link between the first endpoint user and the second endpoint user can be performed by the communications provider transmitting and receiving data test packets. For example, data packets can be transmitted on a communications link to a known destination as a test. The communications provider can monitor the number of data packets, the travel time of the data packets, or combinations thereof, during transmission and receipt, to determine an exact measurement and an indication of quality for the communications link being tested. If a delay in the receipt of the test packets is detected, or not all of the test packets are received at the destination point indicating some of the test packets are being dropped or corrupted; then, degradation in the quality of the performance of the communications link is indicated.

Results from the testing performed with the data test packets, the computer instructions, the end-point user quality information, and other provider information can be compiled into statistics for generating a quality report. The quality report can include an alert, a data snapshot on the status of the communication links at a given moment in time, information on noise on a call using the communication links, information concerning dropped data packets over the communication links, information on delayed data packets over the communication links, or combinations thereof.

A quality report can be generated from the compiled statistics. The generated statistics can be compiled and produced in an intelligent format for producing a quality report. The quality report can be produced as a web-based report for facilitating responses and appropriate dissemination.

The quality report can be produced and stored for a later response to the communication performance or as a reference. The quality report can be used to initiate an immediate response, particularly in the case of a statistical alert, wherein the response can be adjusting controllable equipment or software to improve the quality of the communication connection, in real time.

The embodiments can enable the endpoint user to real-time report a perceived concern about quality of a communications connection to a services provider, such as an internet service provider (ISP), and to enable the communications provider to provide an analysis and a remedy in real-time.

The present embodiments allow for the endpoint users (customer) to be included as part of the communications quality monitoring and adjustment process, which more closely connects the customer to the service provider and ensures improved, high-quality communication connections and services for the user.

The following is an example of how the embodied methods can be used to obtain user-aided quality performance information for a communications connection and produce a quality report in real-time:

Step 1—A first endpoint user signals a services provider in real time, regarding a perceived communication connection quality degradation. An attorney at a law firm in Houston, Tex. calls an attorney at a law firm in New Jersey. Noise on the communication connection during their conversation prevents a clear communication between the attorney in Houston, Tex. and the attorney in New Jersey. The attorney in Houston, Tex. signals, in real-time, her AT&T™ network provider using a touch tone sequence to report the perceived quality communication connection concern.

Step 2—A communications provider determines a first communication link between the first endpoint user and a second endpoint user. A second step of the method includes the AT&T network communications provider using computer instructions to determine a first communication link between the first attorney in Houston, Tex. and a second attorney in New Jersey.

Step 3—A communications provider determines a second communication link between the first endpoint user and the communications provider. A third step of the method includes the AT&T network communications provider using computer instructions to determine a second communication link between the first attorney user in Houston, Tex. and the AT&T network communications provider.

Step 4—An analysis of the first and second communication links for quality is performed by the services provider and statistics based on the analyses for quality in the connection(s) are generated. As an example, the AT&T network communications provider performs a timed analysis using a specified quantity 'n' of data test packets on the communications link between the attorney in Houston, Tex. and the second attorney in New Jersey and receives all test packets within the specified time duration. Next, the AT&T network communications provider performs a timed analysis using a specified quantity 'n' of data test packets on the communications link between the attorney in Houston, Tex. and the AT&T network. Say, in this case, quantity (n-5) valid data test packets are received within the specified time duration, indicating five dropped data test packets and a degradation of quality in the performance of the communications connection between the Houston, Tex. attorney and the AT&T network. Such a packet loss might manifest itself as audible noise to the conversants. Statistics in the form of information regarding the noise on the call connection and an alert to respond in real-time are generated.

Step 5—A quality report is produced from the generated statistics. The AT&T network communications provider acknowledges the alert promptly and uses the statistical information on the behavior of the call to produce a web-based quality report which enables the AT&T network communications provider to respond in real-time to improve the quality on the communication connection. Accordingly, the attorney in Houston, Tex. can now converse using a high-quality communication connection with the Attorney in New Jersey.

The embodiments of the invention can be best understood by reference to the FIGURE. FIG. 1 depicts a method for producing a quality report for a communication connection. The method starts at step 100, which includes signaling, in real time, a service provider by a first user. After step 102 a first communication link is determined between the first user and a second user; then at step 104 a second communication link between the first user and the service provider is determined.

The method continues with step 106, which includes analyzing the first communication link and the second communication link for quality by the service provider forming a quality analysis. Then step 108, generating statistics using the quality analysis, is performed. The method continues at step 110, which includes producing a quality report using the generated statistics.

The depicted embodiment of the method continues with step 112, which includes identifying quality problems with the first communication link and the second communication link based on the generated statistics and immediately adjusting controllable equipment or software to improve quality of the first communication link and the second communication link. Then at step 114 an alarm is provided when quality problems with the first communication link and the second communication link are identified.

The embodied methods and system can be used when the communications link(s) between the conversant endpoints are under the control/management of the same communications provider. For example, both conversants can be AT&T communications services subscribers.

While these embodiments have been described with emphasis on the embodiments, it should be understood that within the scope of the appended claims, the embodiments might be practiced other than as specifically described herein.

What is claimed is:

1. A method for producing a quality report for a communication connection, wherein the method comprises:
signaling a service provider by a first user;
determining a first communication link between the first user and a second user;
determining a second communication link between the first user and the service provider;
analyzing the first communication link and the second communication link for quality by the service provider forming a quality analysis;
generating statistics using the quality analysis;
producing a quality report using the statistics generated;
identifying quality problems with the first communication link and the second communication link based on the statistics generated and immediately adjusting controllable equipment to improve the quality of the first communication link and the second communication link; and
providing an alarm when the quality problems with the first communication link and the second communication link are identified.

2. The method of claim 1, wherein the quality report comprises a member selected from the group consisting of: an alert, a data snapshot on the status of the first and second communication links at a given moment in time, information on noise on a call using the first and second communication links, information concerning dropped data packets over the first and second communication links, information on delayed data packets over the first and second communication links, and combinations thereof.

3. The method of claim 1, wherein signaling a service provider by a first user is performed using a member selected from the group consisting of a touch tone sequence, a special signaling sequence from a voice over IP telephony device, a dial tone multi-frequency tone from a conventional telephone, and combinations thereof.

4. The method of claim 1, wherein analyzing the first communication link and the second communication link entails comprises transmitting and receiving data test packets on the first communication link and the second communication link to determine if the data test packets are dropped during communication.

5. The method of claim 1, wherein analyzing the first communication link and the second communication link comprises transmitting and receiving data test packets on the first and second communication links to determine if the data test packets are delayed in transmission.

6. The method of claim 1, wherein the statistics are produced as a web based quality report.

7. The method of claim 1, wherein the service provider is selected from the group consisting of a land line telephone service provider, a voice over IP service provider, a cellular service provider, a satellite telephone service provider, and combinations thereof.

8. The method of claim 1, wherein analyzing the first communication link and the second communication link is performed automatically using computer instructions when the service provider receives a signal from the first user.

9. The method of claim 1, wherein analyzing the first communication link and the second communication link is delayed by the service provider and performed in a batch analysis.

* * * * *